(12) United States Patent
Laine

(10) Patent No.: US 7,006,622 B2
(45) Date of Patent: Feb. 28, 2006

(54) METHOD AND APPARATUS FOR PRODUCING RINGING TONES IN A COMMUNICATION DEVICE

(75) Inventor: Pauli Laine, Espoo (FI)

(73) Assignee: Nokio Corporation, Espoo (FI)

( * ) Notice: Subject to any disclaimer, the term of this patent is extended or adjusted under 35 U.S.C. 154(b) by 464 days.

(21) Appl. No.: 10/041,706

(22) Filed: Jan. 4, 2002

(65) Prior Publication Data

US 2003/0128834 A1 Jul. 10, 2003

(51) Int. Cl.
*H04M 3/00* (2006.01)

(52) U.S. Cl. ............................ 379/374.01; 379/373.04; 379/373.01

(58) Field of Classification Search ............ 379/373.01, 379/373.02, 373.03, 374.01, 373.04, 374.05
See application file for complete search history.

(56) References Cited

U.S. PATENT DOCUMENTS

| | | | |
|---|---|---|---|
| 5,452,354 A | 9/1995 | Kyronlahti et al. ......... 379/375 |
| 5,753,843 A | 5/1998 | Fay .............................. 84/609 |
| 6,621,903 B1 * | 9/2003 | Oda ....................... 379/374.01 |
| 6,707,908 B1 * | 3/2004 | Nagasawa .............. 379/374.01 |

* cited by examiner

*Primary Examiner*—Jefferey F. Harold
(74) *Attorney, Agent, or Firm*—Ware, Fressola, Van Der Sluys & Adolphson LLP

(57) ABSTRACT

A method and apparatus for producing a ringing tone in a communication device, such as a mobile phone, an electronic organizer or a personal digital assistant, to signal an event in the communication device. The method includes the steps of generating a sequence of musical notes in a random fashion within a range of pitch and duration for defining the musical notes, modifying the sequence of musical notes based on a set of modification rules in order to produce a modified sequence, and repeating the modified sequence for forming a motif. More than one motif can be produced and stored in a computer-readable medium at a user's initiation of the communication device to allow the user to choose one of the motives as a ringing tone for signaling a different event. The user can delete one or more motives stored in the computer-readable medium and generate new ones, if desired.

41 Claims, 10 Drawing Sheets

```
from mid import *
import random

The tst(leng,filename) function is the "main",
calling it executes the program and generates
musical data
Program is based on the idea of repeated
motive, which may include simple motives and
and which can be transformed pitchwise and
rhythmically

ABOUT DATA STRUCTURES:
Two simple array-like lists are used to store
the starting points (from previous notes) and
and the pitches of the notes. It is necessary
to be able to insert and delete from these
lists
These lists are initialized in the tst-
function and after that modified using several
processing functions def tst(leng,filename):
Initialization of the motives and several
control parameters like initial motive length
    mym = midilist()
    mym.filename = filename
    motive = []
    transform = []
    rhythmo = []

Motive transformation data-list
initialization, data is stored pairvise
first representing the transformation
maximum and second in pair the transformation
amount
```

FIG. 4a

```
        transfolen = random.randint(1,3)
        transfotem,transfomodtem = 0,0
        for n in range(transfolen):
            transfotem = random.randint(-2,3)
            transfomodtem = random.randint(-4,4)
            transform.insert(0,transfotem)
            transform.insert(0,transfomodtem)

More control parameters, motive lenght, whole
piece transposition and non-legatones
        motilen = random.randint(2,7)
        transpo = random.randint(-12,12)
        transpo = 0
        randura = random.randint(1,5)

motitem = 4
        startp = 0
        duratio = 12

Actual motive and rhythm initialization
        for n in range(motilen):
            motitem = random.randint(0,24)
            motive.insert(0,motitem)

Rhythmic motive (rhythmo) initialization, it
is assumed that 96 is something like
100 - 200 milliseconds, this has to be
adjusted using some testing system in the
real version
Smaller note values are more probable
        for n in range(motilen):
            motitem = random.randint(0,6)
            if motitem == 0:
                rhythmo.insert(0,48)
            if motitem == 1:
                rhythmo.insert(0,96)
```

FIG. 4b

```
            if motitem == 2:
                rhythmo.insert(0,36)
            if motitem > 2:
                rhythmo.insert(0,24)

several modifying functions may be called in
following lines, these functions could be
switched on or off, if the user would like
switching mechanism not yet implemented
        rhythmo,motive = motivetrills(rhythmo,motive)
        rhythmo = nonmechanizer(rhythmo)
        print rhythmo
        motive = motiverulessamenes(motive)
        motive = diatonicer(motive)
        motive = motiverules(motive)

The motive lenght may be changed because of
transformations, so the "motilen" variable is
updated:
        motilen = len(motive)
Main generation loop, processed motive is read
several times and simultaneously modified
using transform-system
        for n in range(leng):
            ###TRANSFORMATION FLAG HERE!!!
if n % 4 == transform[0] % 4:
            if n % motilen == abs(transform[0]):
                motive[n % motilen] = motive[n %
motilen] + transform[1]
            if motive[n % motilen] > transform[0]:
                motive[n % motilen] = motive[n %
motilen] - 12
            if motive[n % motilen] < transform[0]:
                motive[n % motilen] = motive[n %
motilen] + 12
```

FIG. 4c

```
we test the motive after transformation so as
to make it more "beautiful"
        motive = motiverules(motive)
        pitch = motive[n % motilen]
        rhyth = rhythmo[n % motilen]

Following statement is the output-statement,
by replacing it with ringdata.h type
outputter, proper data type for output may be
obtained
        mym.putdata(startp,144,pitch + 79 +
transpo,64,duratio)

print startp,pitch,duratio
Following three lines updates the starting
points and calculates suitable note durations
non-legato playing) with not too clever way
        startp = startp + (rhyth / 2)
        duratio = rhythmo[(n + 1) % motilen] / 2
        duratio = duratio - randura
        if duratio < 6:
            duratio = 6
        if duratio == 10 :
            duratio = 9 midi-routines, do not care
    mym.calcdelta()
    mym.putmidi()

print mym.filename,' - done'

This function is a heuristic interval
corrector, which tries to prohibit bad
sounding intervals like tritonus and sevenths
This function returns the transformed motive
```

FIG. 4d

```
def motiverules(motive):
    k,intv,na,nb  = 1,0,0,0
    while k < len(motive):
        na = motive[k - 1]
        nb = motive[k]
        if na - nb == -6:
            nb = nb + 1
            motive[k] = nb
        if na - nb == 6:
            nb = nb - 1
            motive[k] = nb if na - nb == -10:
            nb = nb + 2
            motive[k] = nb
        if na - nb == 10:
            nb = nb - 2
            motive[k] = nb if na - nb == -11:
            nb = nb + 1
            motive[k] = nb
        if na - nb == 11:
            nb = nb - 1
            motive[k] = nb
        k = k + 1
    return motive def diatonicer(motive):
    scale = []
    k,intv,na,nb  = 1,0,0,0
    tmp,carryflag,protopos = 0,0,0
    majorproto = scaleproto while k < len(motive):
        na = motive[k]
        if na % 12 == 3 or na  % 12 == 1 or na %
12 == 6 or na % 12 == 8 or na % 12  == 10:
```

FIG. 4e

```
            na = na - 1
        motive[k] = na
            k = k + 1
    return motive

This function makes small random inaccuracies
for the playing to get more "natural" feeling
def nonmechanizer(rhythmo):
    k,intv,na,nb  = 1,0,0,0
    while k < len(rhythmo):
        na = rhythmo[k]
        na = na + random.randint(-3,14)
        rhythmo[k] = na
        k = k + 1
    return rhythmo

This rule prohibits successive identical
intervals, this is necessary, because they
sound bad in faster tempi
def motiverulessamenes(motive):
    k,intv,na,nb  = 1,0,0,0
    while k < len(motive):
        na = motive[k - 1]
        nb = motive[k]
        if na - nb == 0:
            nb = random.randint(0,24)
            motive[k] = nb
        k = k + 1
    return motive

This system changes long note values (i.e. 96)
to series of alternating pitches
The series may have its own pitch
transformation
the lenght of both motive and rhythmo may be
changed in a non-foreseeable way
def motivetrills(rhythmo,motive):
    k,kk,intv,na,nb,np  = 0,0,0,0,0,0
```

FIG. 4f

```
transfo = random.randint(0,4)
transfob = random.randint(0,4)
transforva = random.randint(-4,4)
transforvab = random.randint(-4,4)
trillen = random.randint(2,16)

while k < len(rhythmo):
    na = rhythmo[k]
    nb = motive[k]
    np = motive[(k + 1) % len(motive)]
    k = k + 1
    if na == 96:
        rhythmo.remove(96)
        motive.remove(nb)
        for kk in range(trillen):
            rhythmo.insert(k,12)
            if kk % 2 == 0:
                if transfo == 3:
                    motive.insert(k,nb + transforva)
                if transfo < 3:
                    motive.insert(k,nb)
                if transfo == 4:
                    motive.insert(k,nb - transforva)

if kk % 2 == 1:
                if transfob == 3:
                    motive.insert(k,np + transforvab)
                if transfob < 3:
                    motive.insert(k,np)
                if transfob == 4:
                    motive.insert(k,np - transforvab)
    return rhythmo,motiv
tst(165,'mecal.mid')
```

FIG. 4g

METHOD AND APPARATUS FOR PRODUCING RINGING TONES IN A COMMUNICATION DEVICE

FIELD OF THE INVENTION

The present invention is generally related to the making of a ringing tone in a communication device for signaling an incoming telephone call or indicating the reception of a message.

BACKGROUND OF THE INVENTION

In an old styled telephone set, the ring tone that is used to signal an incoming telephone call is usually produced by a ringer repeatedly striking one or two bells. In a mobile phone, the ringing tone is produced by an electronic buzzer, which produces a pitch of a given frequency according to a value in a data stream representative of a series of musical tones.

Electronically producing music is well known in the art. For example, U.S. Pat. No. 5,753,843 (Fay) discloses a system and process for composing a musical section in response to a user's interaction with a multimedia presentation. As disclosed in Fay, the system includes a composition engine, a performance engine and an arbitrator. The arbitrator provides an interface with an application program running a multimedia presentation. The arbitrator receives parameters from the application program indicative of the user's interaction and the type of music the application program requested in response to the user's interaction. The parameters are passed to the composition engine, which composes a musical section having a chord progression and other data therein. The musical section and the style provided by the arbitrator are used by the performance engine to generate music sequence data for driving a musical instrument. The performance of the musical sequence data by the musical instrument occurs substantially contemporaneously with the user's interaction, which causes the composition of the musical section. The composition engine performs a plurality of functions to compose musical sections, wherein the functions are implemented by a musical template generator and a musical section generator. In the musical template generator, the process of template generation begins by invoking a signpost creation process, which places signpost chord markers in an empty template data structure. After the signpost chord markers have been placed in the template, a second process is invoked to provide embellishment commands in the template. The template is then passed to the musical section generator to add musical content to the template. The musical section generator uses a template retrieved from a data storage to compose the musical section. As disclosed, the method for producing musical sections is based on stored data in combination with a "personality", which is a data structure for defining a mood. In order to carry out such a method, a large data storage area is necessary for storing all the templates, and a powerful computer is necessary for data processing. As disclosed in Fay, the required computer system has a least an INTEL 386SX processor with at least two megabytes of RAM and at least five megabytes of disc storage space. Thus, while the selection of chords and the selection of personality are useful for a multimedia presentation, they are impractical for generating ringing tones in a small communication device, such as a telephone.

U.S. Pat. No. 5,452,354 (Kyronlahti et al.) discloses a ringing tone apparatus, wherein subscriber identification information is used to generate the ringing tone. As disclosed in Kyronlahti et al., a ringing tone can be generated based on two or more binary digits of the subscriber identification number such as the mobile station identification number (MSIN), mobile identification number (MIN), etc. For example, if the lowest bits of the identification MSIN are described as a string of 11 binary digits $D10$-$D9$-$D8$-$D7$-$D6$-$D5$-$D4$-$D3$-$D2$-$D1$-$D0$, this string of digits can be used to specify the parameters necessary for generating a ringing tone as follows: $D1$ and $D0$ are used to determine the duration of each ringing tone pulse; $D3$ and $D2$ are used to determine the frequency of the ringing tone pulses; $D5$ and $D4$ are used to determine the pulse number in one pulse sequence; $D7$ and $D6$ are used to determine the number of sequences to be repeated in the ringing tone; and $D10$, $D9$ and $D8$ are used to determine the silence period between pulse sequences. While this tone generation method is useful for producing different ringing tones for different subscribers, the ringing tones may sound too mechanical and may contain musical notes that are not pleasing when played together.

Thus, it is desirable to provide a method to produce a vast range of plausible and pleasing telephone ringing tones, wherein the ringing tones are randomly produced so as to allow a user to select a different ringing tone to signal an incoming telephone call or to indicate the reception of a voice or data message.

SUMMARY OF THE INVENTION

The first aspect of the present invention is a method of producing a ringing tone to be used in a communication device, such as a telephone, an electronic organizer or a personal digital assistant (PDA), wherein the ring tone is representable by a plurality of musical notes. The method comprises the steps of:

generating a sequence of musical notes, wherein each note has a pitch and a duration;

modifying the sequence according to a set of modification rules regarding the pitch and the duration of the musical notes within the sequence for producing a modified sequence; and repeating the modified sequence a number of times for forming a string of musical notes indicative of the ringing tone.

Preferably, these steps are initiated by a user via an initiation signal, wherein the initiation signal is provided by an activation device.

Preferably, the pitch of at least one note is randomly assigned within a range of musical tones, and the duration of at least one note is randomly assigned within a range of note duration in response to the initiation by the user for producing a motif in a substantially random fashion.

Preferably, the sequence has a length represented by a number of notes, wherein the note number is randomly assigned within a range of positive integers.

Preferably, the method also comprises the step of modifying the sequence according to at least one of the modification rules, wherein the plurality of modification rules include:

a) eliminating identical pitches occurring in adjacent notes by way of pitch replacement;

b) modifying the duration of the notes in a random fashion in order to produce a non-mechanical playing effect;

c) shortening the duration of the notes in order to produce a non-legato or staccato playing effect;

d) correcting a tonal interval between adjacent notes by way of pitch replacement if the tonal interval is a tritone or a seventh;

e) changing the pitch of the notes if the pitch is equivalent to one of the black keys on a piano;

f) changing a note into a series of trills if the duration of the note is equal to or greater than a predetermined value; and g) changing the pitch of a note according to the relative placement of that note in the sequence.

It is possible that the duration of one note in the sequence is different from the duration of other notes in the sequence.

It is possible that the duration of all the notes in the sequence is the same.

Preferably, the method further comprises the steps of:

storing digital data indicative of the sequence of musical notes in a computer-readable medium;

retrieving the digital data from the computer-readable medium prior to modifying the sequence so as to allow the modifying step to produce the modified sequence based on the digital data;

storing further digital data indicative of the modified sequence in the computer-readable medium;

retrieving the further digital data from the computer-readable medium prior to repeating the modified sequence so as to allow the repeating step to form the string of musical notes based on the further digital data; and converting the further digital data into an audio form indicative of the ringing tone.

Preferably, the motives so generated at the initiation by the user can be stored in a memory unit of the communication device so as to allow the user to choose a ringing tone for signaling an incoming telephone call or indicating the reception of a voice or data message. The user can choose a different ringing tone for signaling a different event, if so desired. Furthermore, the user can decide to delete or to keep a ringing tone that is produced in response to the user activating the switch. The user can also delete one or more modified sequences stored in the computer-readable medium and generate new ones, if so desired.

The second aspect of the present invention is an apparatus for providing a ringing tone for storage in a communication device, wherein the ringing tone is representative of a plurality of musical notes defined by pitch and duration and the ringing tone is provided in response to an initiation signal provided by a user. The apparatus comprises:

a mechanism, responsive to the initiation signal, for generating a sequence of musical notes and for providing a first signal indicative of the sequence of musical notes, wherein each note has a pitch and a duration;

a mechanism, responsive to the first signal, for modifying the sequence according to a set of modification rules regarding the pitch and the duration of the musical notes within the sequence for producing a modified sequence, and for providing a second signal indicative of the modified sequence; and a mechanism, responsive to the second signal, for repeating the modified sequence a number of times for forming a string of musical notes indicative of the ringing tone.

Preferably, the device also includes a computer-readable medium and a mechanism, responsive to the string of musical notes, for providing digital data indicative of the musical notes;

a mechanism, responsive to the digital data, for storing the digital data in the computer-readable medium;

a mechanism, responsive to the initiation signal, for retrieving the digital data from the computer-readable medium; and a mechanism for converting the retrieved digital data in to an audible form indicative of the ringing tone.

The third aspect of the present invention is a communication device, such as a mobile phone, an electronic organizer or a personal digital assistance, which comprises:

a mechanism, responsive to an event in the communication device, for producing an event signal;

a computer-readable medium for storing digital data of a sequence of musical notes defined by pitch and duration, wherein the pitch and the duration of the musical notes are chosen in a random fashion but modified according to a set of modification rules regarding the pitch and the duration of the musical notes within said sequence so as to make a modified sequence, and wherein the modified sequence is repeated a number of times so as to form a repeated sequence;

means, responsive to the event signal, for retrieving the digital data from the computer-readable medium;

means, responsive to the retrieved digital data, for converting the digital data into a further signal; and a sound producing device, responsive to said further signal, for providing a ringing tone indicative of the retrieved digital data.

The present invention will become apparent upon reading the description taken in conjunction with FIGS. 1 to 4.

BRIEF DESCRIPTION OF THE DRAWINGS

FIG. 4 is a computer program illustrating the generation of a motif according to the Mecano-style.

DETAILED DESCRIPTION

Figure 1:
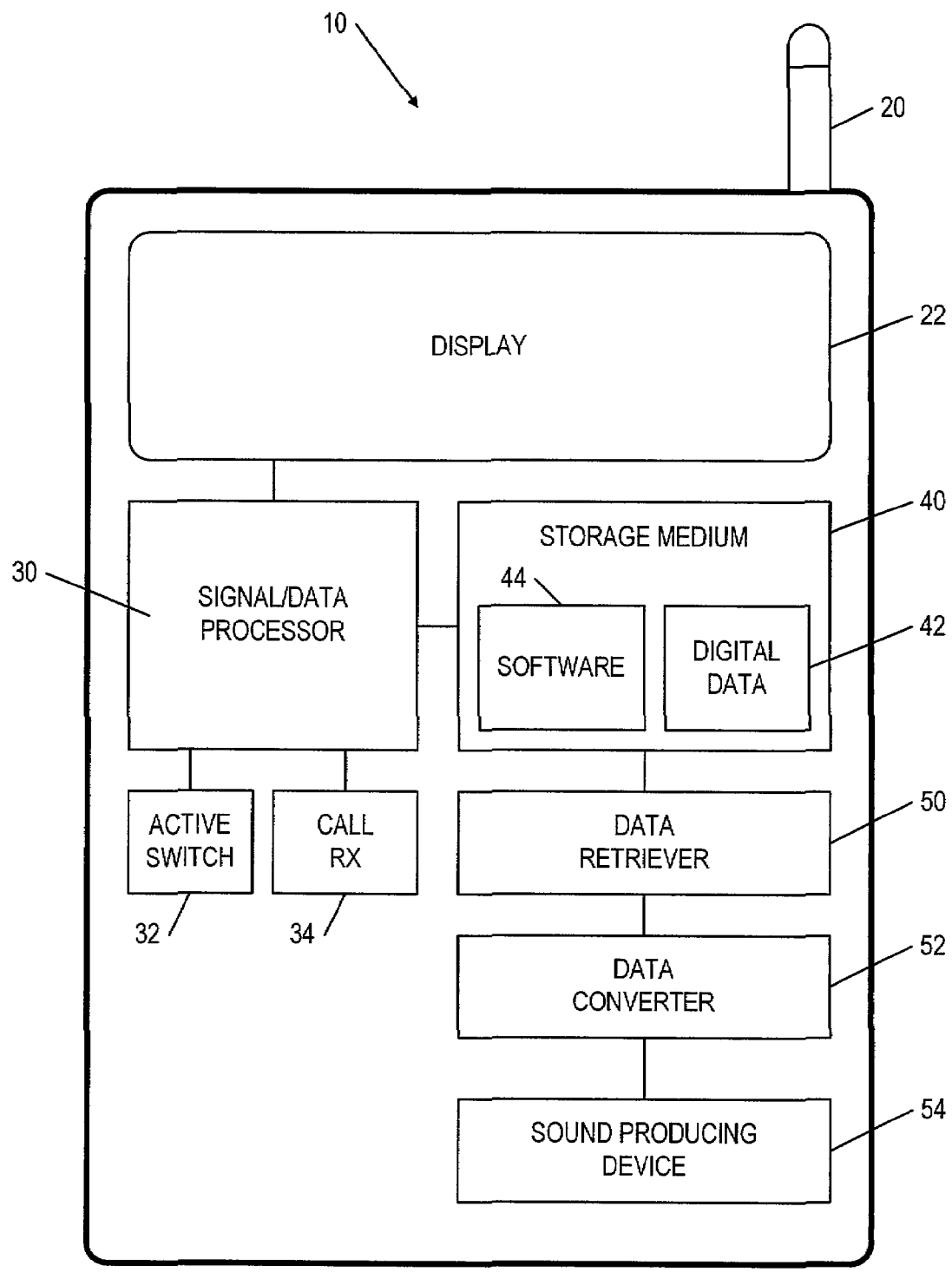
FIG. 1 is a diagrammatic illustration showing a communication device capable of producing a ringing tone.

FIG. 1 shows a communication device, such as a personal digital assistant (PDA) or a mobile phone 10, which has an antenna 20 for communication purposes. The communication device 10 has a display 22 for displaying communication messages, and a signal/data processor 30 for processing communication signals received or transmitted via the antenna 20. The communication device 10 further comprises a storage medium 40 for storing digital data 42 and software 44. The software 44 includes a computer program for generating a sequence of musical notes, wherein each note has a pitch and a duration, and modifying the sequence according to a set of modification rules. An exemplary computer program is shown in FIG. 4. The modified sequence can be repeated a number of times to form a string of music notes, or motif, indicating a ringing tone. The sequence of musical notes can be stored in the storage medium 40 as part of the digital data 42. Preferably, the motif is generated at the initiation by a user who activates an active switch 32. The generated motif can also be stored in the storage medium 40 as part of the digital data 42. More than one motif can be generated and stored as that the user can choose a ringing tone for signaling an incoming phone call, indicating an incoming email or voice message, or reminding the user of a forthcoming event as stored in the storage medium 40. For example, when an incoming phone call is received by the call receiver 34, a data retriever 50 retrieves one of motives stored in the storage medium 40 for producing a first signal indicative of the retrieved motif. A data converter 52, responsive to the first signal, converts the retrieved motif into an analog form to be conveyed to a sound producing device 54, which provides an audible form indicative of the ringing tone. The major feature of the present invention is that the ringing tone, as produced by the communication device 10, is not a fixed pattern that is pre-stored in the storage medium 40, nor is it selected from a plurality of fixed patterns stored in the storage medium 40. Rather, the ringing tone is generated at the initiation of a user who activate an activation device or switch 32 to start the motif generation process. The algorithm for the motif generation software 44 is designed such that the motif generated at one time is very unlikely to be identical to the motif generated at another time. If the user prefers keeping the generated motif as a ringing tone, the user can store the motif for future use. Otherwise the user can delete the generated motif. The user can also delete one or more motives stored in the storage medium 40 if so desired.

Figure 2:
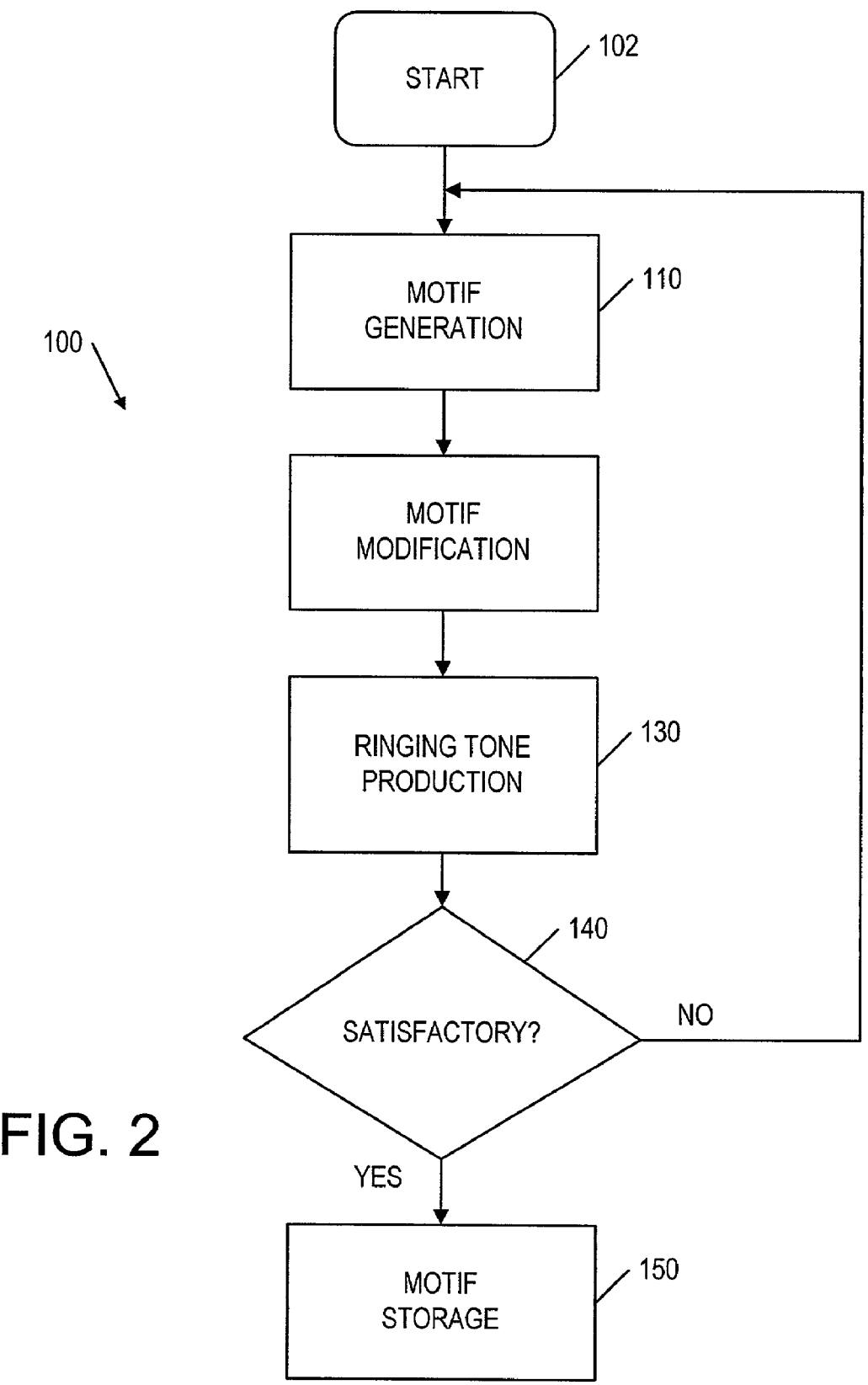
FIG. 2 is a flow chart illustrating the steps in producing the ring tone.

FIG. 2 is a flow chart illustrating the steps for generating and storing a motif which is used to produce a ringing tone. As shown, an initiation signal is provided to the motif generation software 44, in response to the user activating the switch 32 to start the generation process 100 at step 102. The motif generation software 44 generates a motif or a sequence of notes at step 110, wherein each note has a pitch and a duration. The assignment of the pitch and duration to each note is carried out in a random fashion, as described in conjunction with FIG. 3. The assigned pitch and duration of each note is modified according to a plurality of modification rules at step 120. The modification rules, according to the Mecano-style, are described in conjunction with FIG. 4, which is broken into FIGS. 4a–4g because of the length of the computer program. Preferably, after the motif is generated and modified, it is output to the sound producing device 54 in a repeating manner in order to produce a ringing tone at step 130. Preferably, the ringing tone produced at step 140 is played to the user so as to allow the user to determine whether he or she likes the ringing tone at step 140. If the user likes the ringing tone produced from the motif, the motif can be stored in the storage medium 40 at step 150 for later use. Otherwise the generated motif is discarded. The generation process 100 can be repeated if the user wishes to generate a plurality of ringing tones.

Figure 3:
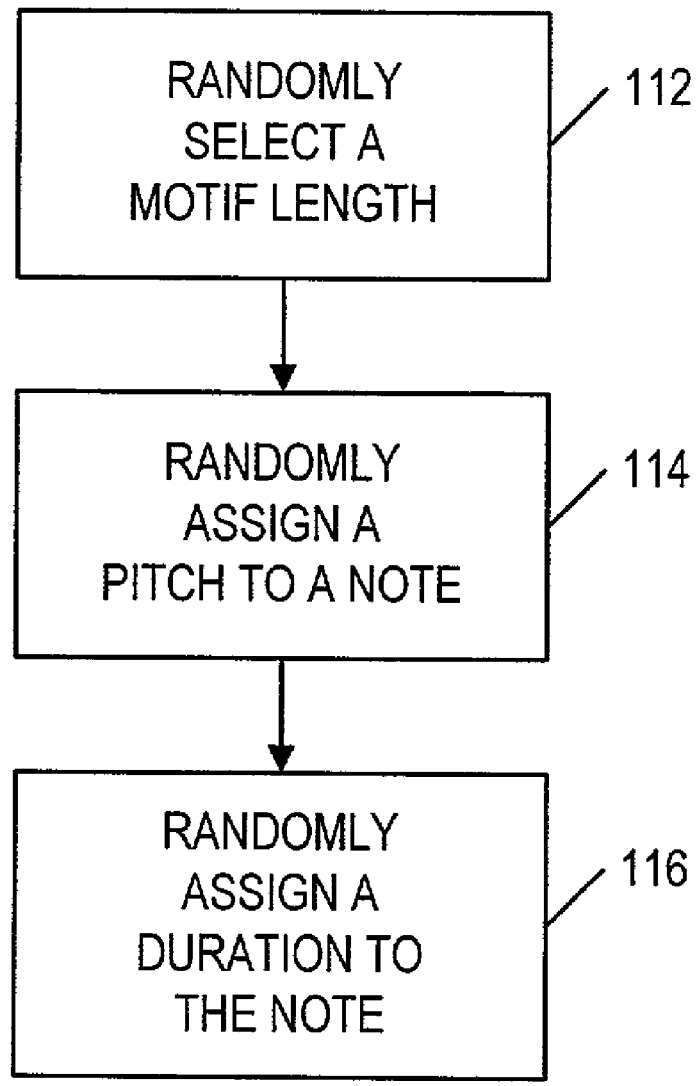
FIG. 3 is a flow chart illustrating the steps of producing a motif.

FIG. 3 is a flow chart illustrating the steps for generating a motif by the motif generation software 44. At step 112, the software 44 randomly selects the length of the motif in terms of number of notes. Preferably, the number of notes in a motif ranges from 2 to 7. However, a number of notes in the motif can be greater than 7. The motif length selection step can be identified in FIG. 4 by the statement motilen=random.randint(2, 7).

At step 114, the pitch of each note in the motif is randomly assigned within a range of 24 pitch values, representing 24 semi-tones of the diatonic scale. This range is equivalent to the 24 keys (black and white) in two octaves on a piano, for example. The lowest pitch of this range can be the center C key of the piano or any other key. The range of pitches can be shortened or lengthened, if so desired. The pitch assignment step can be identified in FIG. 4 by the following routine:

for n in range (motilen):
motitem=random.randint (0, 24)
motive.insert (0, motitem).

At step 116, the duration of each note in the motif is randomly assigned, preferably within a range of four note values: 1/16, dotted 1/16, 1/8 and 1/4. These note represented by four numbers: 24, 36, 48 and 96, respectively. It should be noted that the range of note durations can be shortened to two or three, or lengthened to five or more. The duration assignment step can be identified in FIG. 4 by the following routine:

for n in range (motilen):
motitem=random.randint (0, 6)
if motitem=0: rhythmo.insert (0, 48)
if motitem=1: rhythmo.insert (0, 96)
if motitem=2: rhythmo.insert (0, 36)
if motitem>2: rhythmo.insert (0, 24)

Because the motif length, the pitch for each note in the motif, and the duration of each note in the motif are randomly selected or assigned, one generated sequence of notes is very unlikely to be identical to another generated sequence of notes. The melodic and rhythmic variations in the motif, as generated in steps 112, 114 and 116, are in the hundreds, as are the melodic and rhythmic variations in the ringing tone.

In order to make the ringing tone sounds more natural and more pleasing, the motif generated in steps 112, 114 and 116 is modified according to a plurality of Mecano-style modification rules as described below:

A) non-mechanical playing—for each note, introducing a small, random correction of the duration. That is, the duration for each note in the generated motif is slightly shortened or lengthened in a random fashion (the algorithm for this rule can be identified in FIG. 4 by the nonmechanizer routine, where the random value for duration correction ranges from −3 to 14);

B) non-legato playing—shortening the duration of each note by a fixed amount (the algorithm for this rule can be identified in FIG. 4 by the routine startp=startp+(rhyth/2), duratio=rhythmo{(n+1)%motilen}/2, where startp represents the start-point of a note from the preceding note);

C) white keys only—eliminating the pitches that are correspondent to the black keys on a piano (the algorithm for this rule can be identified by the diatonicer routine in FIG. 4, wherein a pitch na is replaced by na−1 if na%12 is equal to 3, 1, 6, 8 or 10);

D) removal of identical pitches—preventing two adjacent notes within one motif or within adjacent motives from having the same pitch (the algorithm for this rule can be identified in FIG. 4 by the motiverulessamenes routine);

E) toner internal correction—changing the pitch of a note in the motif if the tonal interval between adjacent notes is a tritone or a seventh (the algorithm for this rule can be identified in FIG. 4 by the motiverules routine, wherein the pitch nb of a note is replaced by nb+1 if the difference between nb and the pitch na of the preceding note is equal to −6, 6, −10, 10, −11 or 11);.

F) trills—converting a note into a series of trills if the note value of the note is equal to or greater than a pre-determined note value (the algorithm for this rule can be identified in FIG. 4 by the motivetrills routine, where a pitch na of a note is replaced by a series of alternating pitches if na=96); and G) motif transformation—a subtle linear change in the pitches of the notes located at certain locations in the motif (the algorithm for this rule can be identified by the transformation routine in FIG. 4).

Preferably, the modification rules are selectable in that the user can choose one or more rules to modify a motif, if so desired.

After the sequence is generated, the pitch and the duration are assigned to become a motif of musical tones, and the motif is modified. The modified motif is treated as a string of data to be conveyed to the sound-producing device 54 in order to produce a ringing tone. The conversion of data stream to musical tones in accordance with a certain protocol is well known in the art. For example, notes as played by buzzer, MIDI or some other output-method can be specified by a limited set of parameters. The essential parameters for producing a sequence of musical tones include the start-point (starts, the time to start a note from the immediately previous note), the pitch (pitch) and the duration (duratio).

FIG. 4 is an exemplary computer program for generating a motif in the Mecano-style. It should be noted that the computer program and the routines contained therein can be modified, and the Mecano-style modification rules can be added or deleted without departing from the objective of the present invention, which is to make the ringing tones sound more natural. Furthermore, the range of the motif length, the ranges of the pitch and duration to be assigned to each note, the range of the duration correction in non-legato playing and non-mechanical playing, and the pre-determined note value for trill conversion can be altered without changing the scope of the present invention.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of providing a ringing tone for storage in a communication device, said method comprising the steps of:
   generating a sequence of musical notes defined by pitch and duration;
   modifying the sequence according to a set of modification rules regarding the pitch and the duration of the musical notes within the sequence for providing a modified sequence; and
   repeating the modified sequence a number of times for providing a string of musical notes indicative of the ringing tone.

2. The method of claim 1, further comprising the steps of:
   storing digital data indicative of the modified sequence in a computer-readable medium; and
   retrieving the digital data from the computer-readable medium prior to repeating the modified sequence so as to allow the repeating step to form the string of musical notes based on the digital data.

3. The method of claim 1, further comprising the step of converting the string of musical notes in an audible form indicative of the ringing tone.

4. The method of claim 2, further comprising the step of converting the string of musical notes in an audible form indicative of the ringing tone.

5. The method of claim 1, wherein at least one note in the sequence of musical notes is chosen within a range of musical tones in a random fashion.

6. The method of claim 1, wherein the duration of at least one note in the sequence of musical notes is chosen within a range of time duration.

7. The method of claim 1, wherein the duration of one note in the sequence of musical notes is different from the duration of at least another note in the sequence.

8. The method of claim 1, wherein the duration of the all the notes in the sequence of musical notes is the same.

9. The method of claim 1, wherein the sequence of musical notes is defined by a note number, and the note number is chosen within a range of positive integers.

10. The method of claim 1, further comprising the steps of:
   d) storing digital data indicative of the string of musical notes in a computer-readable medium;
   e) retrieving the digital data from the computer-readable medium; and
   f) converting the digital data into an audible form indicative of the ringing tone.

11. The method of claim 1, wherein the generating step is initiated by a user of the communication device.

12. The method of claim 2, wherein the steps of (a) through (c) are repeated for producing a plurality of different modified sequences for allowing a user of the communication device to select one of the plurality of different modified sequences for forming the string of musical notes as the ringing tone indicative of an event in the communication device.

13. The method of claim 12, wherein the communication device is a telephone and the event is indicative of an incoming telephone call.

14. The method of claim 12, wherein the communication device is a telephone, has means for storing a voice or data message and the event is indicative of the stored voice or data message.

15. The method of claim 12, wherein the communication device is a personal digital assistant and the event is indicative of a message.

16. The method of claim 12, wherein the communication device is a personal digital assistant and the event is indicative of a scheduled event in a calendar.

17. The method of claim 12, wherein the communication device is an electronic organizer and the event is indicative of a scheduled event for reminding the user of the scheduled event.

18. The method of claim 1, wherein the modification rules are stored in a computer-readable medium in a form of computer program for modifying the sequence.

19. The method of claim 1, wherein the modification rules include one or more of the following steps:
   eliminating identical pitches occurring in adjacent notes by way of pitch replacement, wherein one of said identical pitches is replaced by another pitch;
   modifying the duration of the notes in a random fashion for producing a non-mechanical playing effect;
   shortening the duration of the notes for producing a non-legato or staccato playing effect;
   correcting a tonal interval between adjacent notes by way of pitch replacement if the tonal interval is a tritone or a seventh;
   changing the pitch of the notes if the pitch corresponds to one of the black keys on a piano;
   changing at least one note into a series of trills if the duration of said note is equal to or greater than a predetermined value; and
   changing the pitch of at least one note according to the relative placement of said note in the sequence.

20. An apparatus for providing a ringing tone for storage in a communication device, said apparatus comprising:
   means, for generating a sequence of musical notes defined by pitch and duration;
   means, for modifying the sequence according to a set of modification rules regarding the pitch and the duration of the musical notes within the sequence for providing a modified sequence; and means, for repeating the modified sequence a number of times for providing a string of musical notes indicative of the ringing tone.

21. The apparatus of claim 20, further comprising:
means, for storing digital data indicative of the modified sequence in a computer-readable medium; and
means, for retrieving the digital data from the computer-readable medium prior to repeating the modified sequence so as to allow the repeating step to form the string of musical notes based on the digital data.

22. The apparatus of claim 20, further comprising means for converting the string of musical notes in an audible form indicative of the ringing tone.

23. The apparatus of claim 21, further comprising means for converting the string of musical notes in an audible form indicative of the ringing tone.

24. The apparatus of claim 20, wherein at least one note in the sequence of musical notes is chosen within a range of musical tones in a random fashion, and wherein said range of musical tones is stored in a computer-readable medium.

25. The apparatus of claim 20, wherein the duration of at least one note in the sequence of musical notes is chosen within a range of time duration, and wherein said range of time duration is stored in a computer-readable medium.

26. The apparatus of claim 20, wherein the sequence of musical notes is defined by a note number and the note number is chosen within a range of positive integers, and wherein said range of positive integers is stored in a computer-readable medium.

27. The apparatus of claim 20, further comprising:
means, for storing digital data indicative of the string of musical notes in a computer-readable medium; and
means, for retrieving the digital data from the computer-readable medium; and
means, for converting the digital data into an audible form indicative of the ringing tone.

28. The apparatus of claim 20, wherein the generating means generates the sequence of musical notes in response to an initiation signal provided by the user of the communication device.

29. The apparatus of claim 21, further comprising means for providing and storing a plurality of different modified sequences in the computer-readable medium for allowing a user of the communication device to select one of the different modified sequences as the ringing tone indicative of an event in the communication device.

30. The apparatus of claim 21, wherein the modification rules are stored in a computer-readable medium and wherein the modification rules include one or more of the following steps:
eliminating identical pitches occurring in adjacent notes by way of pitch replacement wherein one of said identical pitches is replaced by another pitch;
modifying the duration of the notes in a random fashion for producing a non-mechanical playing effect;
shortening the duration of the notes for producing a non-legato or staccato playing effect;
correcting a tonal interval between adjacent notes by way of pitch replacement if the tonal interval is a tritone or a seventh;
changing the pitch of the notes if the pitch corresponds to one of the black keys on a piano;
changing at least one note into a series of trills if the duration of said note is equal to or greater than a predetermined value; and
changing the pitch of at least one note according to the relative placement of said note in the sequence.

31. A communication device comprising:
means, in response to an event in the communication device, for producing an event signal;
a computer-readable medium for storing digital data indicative of a sequence of musical notes defined by pitch and duration, wherein the pitch and the duration of the musical notes are chosen in a random fashion but modified according to a set of modification rules regarding the pitch and the duration of the musical notes within said sequence for making a modified sequence, and wherein the modified sequence is repeated a number of times for forming a repeated sequence;
means, responsive to the event signal, for retrieving the digital data from the computer-readable medium;
means, responsive to the retrieved digital data, for converting the digital data into a further signal; and
a sound producing device, responsive to said further signal, for providing a ringing tone indicative of the retrieved digital data.

32. The communication device of claim 31, further comprising a telephone and the event includes an incoming telephone call, wherein the ringing tone signals the incoming telephone call.

33. The communication device of claim 31, further comprising a telephone and the event includes a voice or data message, wherein the ringing tone signals the voice or data message.

34. The communication device of claim 31, further comprising a personal digital assistant and the event includes a scheduled event stored in a calendar in the personal digital assistant, wherein the ringing tone signals the scheduled event.

35. The communication device of claim 31, further comprising an electronic organizer and the event includes a scheduled event stored in a calendar in the electronic organizer, wherein the ringing tone signals the scheduled event.

36. The communication device of claim 31, further comprising:
means, responsive to an initiation signal, for generating the sequence of musical notes;
means, responsive the sequence, for modifying the sequence of musical notes and for providing the modified sequence;
means, response to the modified sequence, for repeating the modified sequence.

37. The communication device of claim 36, wherein the initiation signal is provided by a user of the communication device.

38. The communication device of claim 37, further comprising means for providing and storing a plurality of different modified sequences in the computer-readable medium for allowing the user to choose one of the different modified sequences for forming the string the musical notes as the ringing tone.

39. The communication device of claim 31, wherein the duration of at least one note in the sequence of musical notes is chosen within a range of time duration, and wherein said range of time duration is stored in the computer-readable medium.

40. The communication device of claim 31, wherein the sequence of musical notes is defined by a note number and the note number is chosen within a range of positive integers, and wherein said range of positive integers is stored in the computer-readable medium.

41. The communication device of claim 31, wherein the modification rules are stored in the computer-readable medium, and wherein the modification rules include one or more of the following steps:
  eliminating identical pitches occurring in adjacent notes by way of pitch replacement, wherein one of said identical pitches is replaced by another pitch;
  modifying the duration of the notes in a random fashion for producing a non-mechanical playing effect;
  shortening the duration of the notes for producing a non-legato or staccato playing effect;
  correcting a tonal interval between adjacent notes by way of pitch replacement if the tonal interval is a tritone or a seventh;
  changing the pitch of the notes if the pitch is corresponding to one of the black keys on a piano;
  changing at least one note into a series of trills if the duration of said note is equal to or greater than a predetermined value; and
  changing the pitch of at least one note according to the relative placement of said note in the sequence.

* * * * *

UNITED STATES PATENT AND TRADEMARK OFFICE
CERTIFICATE OF CORRECTION

PATENT NO. : 7,006,622 B2
DATED : February 28, 2006
INVENTOR(S) : Pauli Laine

It is certified that error appears in the above-identified patent and that said Letters Patent is hereby corrected as shown below:

<u>Title page,</u>
Item [73], Assignee, "Nokio Corporation" should be -- Nokia Corporation --.

Signed and Sealed this

Thirtieth Day of May, 2006

JON W. DUDAS
*Director of the United States Patent and Trademark Office*